(12) United States Patent
Shitano (10) Patent No.: US 7,072,489 B2
(45) Date of Patent: Jul. 4, 2006

(54) PRINT CONTROL METHOD USING ELECTRONIC WATERMARK INFORMATION

(75) Inventor: Masaki Shitano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/201,981

(22) Filed: Jul. 25, 2002

(65) Prior Publication Data

US 2003/0028487 A1 Feb. 6, 2003

(30) Foreign Application Priority Data

Jul. 31, 2001 (JP) .............................. 2001-232959

(51) Int. Cl.
*G06K 9/00* (2006.01)
(52) U.S. Cl. ...................... 382/100; 382/175; 713/176
(58) Field of Classification Search ................ 382/100, 382/112, 113, 156, 168, 175, 179, 181, 235, 382/260, 274, 305, 317, 182, 232; 713/176; 358/1.15, 1.16, 3.28
See application file for complete search history.

(56) References Cited

U.S. PATENT DOCUMENTS

| | | | | |
|---|---|---|---|---|
| 6,166,826 A * | 12/2000 | Yokoyama | ................. | 358/1.16 |
| 6,233,684 B1 * | 5/2001 | Stefik et al. | ................. | 713/176 |
| 6,341,294 B1 | 1/2002 | Yoshida | ................. | 707/501.1 |
| 6,580,806 B1 * | 6/2003 | Sato | ............................ | 382/100 |
| 6,628,417 B1 * | 9/2003 | Naito et al. | ................. | 358/1.15 |
| 6,650,761 B1 * | 11/2003 | Rodriguez et al. | .......... | 382/100 |
| 6,823,075 B1 * | 11/2004 | Perry | ......................... | 382/100 |

FOREIGN PATENT DOCUMENTS

JP 2002-156980 5/2002

OTHER PUBLICATIONS

U.S. Appl. No. 09/471,227, filed Dec. 23, 1999.

* cited by examiner

*Primary Examiner*—Jingge Wu
*Assistant Examiner*—Seyed Azarian
(74) *Attorney, Agent, or Firm*—Fitzpatrick, Cella, Harper & Scinto (57) ABSTRACT

If identifying information for identifying a print request is not included in the print request transmitted from a user computer, the identifying information for the print request is generated, and the identifying information is embedded in a received image data to be printed as an electronic watermark. The image data in which the electronic watermark has been embedded is stored by associating that image with the identifying information and the image data is outputted to a print server. If the identifying information is included in the print request, image data corresponding to the identifying information is searched, and electronic watermark information of the identifying information related to the previous print request is extracted from the searched image data to transmit it to the user computer.

7 Claims, 7 Drawing Sheets

PRINT CONTROL METHOD USING ELECTRONIC WATERMARK INFORMATION

BACKGROUND OF THE INVENTION

1. Field of the Invention

The present invention relates to a method of controlling a reprint operation by embedding electronic watermark information in image data for the print and an image processing apparatus for executing that method.

2. Related Background Art

In recent years, with the remarkable improvement of performance on a computer, the advance of technology for a network such as an internet or the like, and the spread of such the technology to general society, for example, an operation of transmitting or receiving various data such as image data and the like through a network comes to be widely performed. Furthermore, a service capable of outputting image data on a network onto the print using a remote printer (hereinafter, called "print service") also comes to be presented.

By the way, in the above print service, a user requests to print a desired image for a print service providing side (hereinafter, called "service provider side"), thereby performing a print output of the corresponded image data by a printer. However, for example, in case of reperforming a print request of image data which is same as that of before requested to print by a user, any of the following methods 1 to 3 is adopted.

Method 1: the user transmits the same image data again to a service provider side.

Method 2: instead of transmitting the same image data again, the user stores information at the time of performing a print request of the last time and reperforms the print request on the basis of print request information at that time.

Method 3: in case of performing a print output, a visible identifier is embedded in target image data, and the print request is performed using that identifier.

However, in the above conventional print service capable of performing the print output of the image data on the network using the remote printer, there occurred the following problems.

First, in order to perform a precise print output of the target image data, since it is required to adjust the target image data to an image file of large data amount, it becomes important to perform the more effective transmission. For a user who utilizes such the print service, it becomes important that the communication cost is reduced.

For example, in case of utilizing Method 1, the transmission cost due to that method results in the high cost. In case of utilizing Method 2, if the user loses print request information of the last time, a print request utilizing this print request information can not be performed. In case of utilizing Method 3, extra information for the user is outputted on the print.

SUMMARY OF THE INVENTION

An object of the present invention is to provide a print service of eliminating the above inconvenience, a print control method of achieving the above print service and an image processing apparatus for executing that method.

Another object of the present invention is to provide a print service capable of always being efficiently utilized by a user and obtaining a print output result desired by the user, a print control method of achieving the above print service and an image processing apparatus for executing that method.

Still another object of the present invention is to provide a print service capable of utilizing the print service without retransmitting image data in case of printing an image which was once printed utilizing the print service again by use of the print service, a print control method of achieving the above print service and an image processing apparatus for executing that method.

Other objects of the present invention will become apparent from the detailed description based on the accompanying attached drawings and the appended claims.

DETAILED DESCRIPTION OF THE PREFERRED EMBODIMENTS

Hereinafter, the preferred embodiments of the present invention will be explained with reference to the attached drawings.

Figure 1:
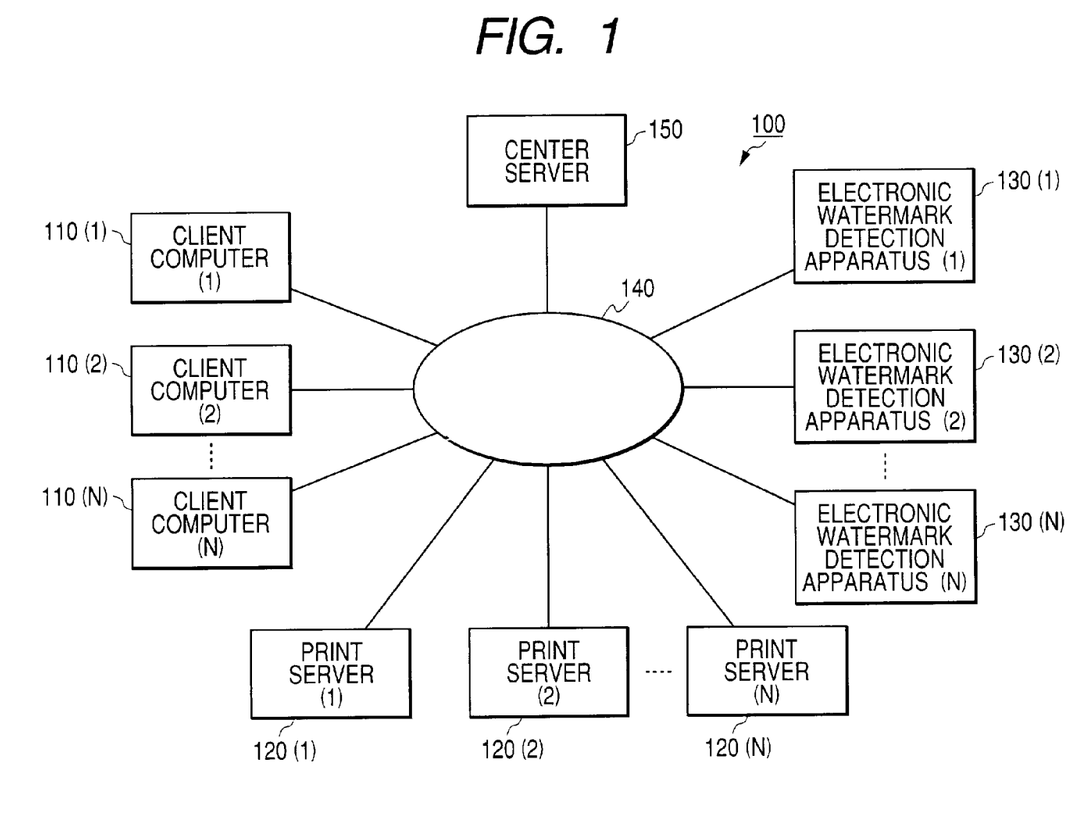
FIG. 1 is a block diagram showing the structure of a network system to which the present invention is applied.

The present invention is, for example, applied to a network system 100 as shown in FIG. 1.

The network system 100 in the present embodiment is made to provide a service (print service) of printing image data by a remote print server 120($x$) for a user at a client computer 110($x$) side. Especially, in a case where the user reperforms a print output of the same image data, it is structured that the above print process can be executed without reperforming transmission of the same image data by the user and adding extra information for the user to a print output result.

Hereinafter, as to the network system 100 in the present embodiment, a brief outline of structure and operation will be explained, and then each of the structural units will be explained in detail.

<Entire Structure of Network System 100>

As shown in FIG. 1, the network system 100 is structured that client computers 110(1) to 110(N), print servers 120(1) to 120(N), electronic watermark detection apparatuses 130(1) to 130(N) and a center server 150 are connected through a network 140 such that they can communicate each other.

Each of the client computers 110(1) to 110(N) is such a computer (information processing apparatus) composed of a CPU, a ROM, a RAM, an HDD and the like. The client computers are used by a client (user) who utilizes a print service for the purpose of directly performing an operation from, for example, an own house or an office.

Particularly, each of the client computers 110(1) to 110(N) has various functions such as a function of browsing information of an image or the like managed by the center server 150 through the network 140, a function of capturing the above information into the client computer, functions of forming documents and editing those documents, a function of requesting a print output of image data (order of image printing request, hereinafter, called "print order" or merely "order") in any of the print servers 120(1) to 120(N) to the center server 150, and the like.

The center server 150 is an information processing apparatus for executing processes on the basis of various requests from the client computers 110(1) to 110(N).

Particularly, the center server 150 has various functions such as a function of holding print order information and image data from the client computers 110(1) to 110(N) and giving electronic watermark information to that image data, a function of collecting the corresponded image data on the basis of a print order and image data storing location information from the client computers 110(1) to 110(N) and issuing a print instruction to any corresponded print server of the print servers 120(1) to 120(N), and the like.

Each of the print servers 120(1) to 120(N) is an information processing apparatus having a function of printing the corresponded image data on the basis of the print instruction from the center server 150, and the like.

Each of the electronic watermark detection apparatuses 130(1) to 130(N) is an information processing apparatus having an image input function, a function of detecting electronic watermark information data from image data inputted by the above image input function, and the like.

The network 140 is optional communication means for mutually connecting the center server 150, the client computers 110(1) to 110(N), the print servers 120(1) to 120(N) and the electronic watermark detection apparatuses 130(1) to 130(N) such that the communication can be mutually performed. For example, a network such as a local area network (LAN), an internet or the like is applicable.

In the present embodiment, although the network 140 is assumed as a general internet, it is not limited to this but other various networks and the like are applicable.

Moreover, arbitrary apparatuses among the center server 150, the client computers 110(1) to 110(N), the print servers 120(1) to 120(N) and the electronic watermark detection apparatuses 130(1) to 130(N) may be achieved by the physically same information processing apparatus (computer).

The number of connections of the center server 150, the client computers 110(1) to 110(N), the print servers 120(1) to 120(N) and the electronic watermark detection apparatuses 130(1) to 130(N) for the network 140 is not limited to a case shown in FIG. 1.

In the following explanation, to simplify the explanation, an optional client computer 110($x$), an optional print server 120($x$) and an optional electronic watermark detection apparatus 130($x$) are noticed among the client computers 110(1) to 110(N), the print servers 120(1) to 120(N) and the electronic watermark detection apparatuses 130(1) to 130(N), and the structure and operation thereof will be explained.

<Entire Operation of Network System 100>

As one example of the operation in the network system 100, an entire operation of the network system 100 from when the user issues a print order of image data until when a print output is performed will be separately explained by two cases of a first order (new print order) and a second order (reprint order).

(1) In Case of First Order

Initially, the user obtains information regarding the print servers 120(1) to 120(N) by the own side client computer (it is assumed as the client computer 110($x$)) through the network 140 and determines a desired print server (it is assumed as the print server 120($x$)) according to the obtained information, then issues designation information of a desired editing process for image data intended to be printed and information indicating the print server 120($x$) to the center server 150 as a print order (hereinafter, called "print order (x)") together with image data equal to or more than one intended to be printed.

When image data (hereinafter, called "target image data") and the print order (x) from the user's client computer 110($x$) are received, the center server 150 numerically issues an identifier (hereinafter called "order ID") for identifying the print order (x), then the order ID is associated with the print order (x).

The center server 150 generates an image identifier for identifying the target image data, and information (hereinafter, called "image ID") obtained by combining the image identifier with the order ID (hereinafter, called "order ID (x)") of the print order (x) is given to the target image data as invisible electronic watermark information using a known method.

The center server 150 stores various information (hereinafter, totally called "order information") such as target image data, to which the electronic watermark information of an image ID (hereinafter called "image ID (x)") obtained by combining the image identifier for identifying the target image data with the order ID (x) for identifying the print order (x) of the target image data is given, the image ID (x), the order ID (x), the print order (x), and the like.

Then, the center server 150 transmits the print order (x) and the image ID (x) to the client computer 110($x$) which transmitted the print order and also transmits the target image data to which the electronic watermark information is given and the print order (x) to the print server 120($x$).

The print server 120($x$) receives the print order (x) and the target image data from the center server 150 and executes a print process of the target image data on the basis of the print order (x), then transmits a print process end notification to the center server 150 after terminating the print process.

When the print process end notification from the print server 120($x$) is received, the center server 150 updates the content of the order information stored before, and then transmits the print process end notification to the client computer 110($x$). The printed papers are delivered to the user by way of delivering by hand or mailing.

(2) In Case of Second Order

Initially, the user transmits the image ID (x) from the client computer 110($x$) to the center server 150 through the network 140 in case of storing the image ID (x) which has been transmitted from the center server 150 when the print order of the last time (here, print order (x)) was issued.

The center server 150 receives the image ID (x) which has been transmitted from the client computer 110($x$) and obtains the order ID (x) corresponding to the image ID (x) from the order information stored before, then further obtains the print order (x) of the last time associated with the order ID (x) to transmit the print order (x) to the client computer 110($x$).

The client computer 110(x) displays the content of the print order (x) which has been transmitted from the center server 150.

The user confirms the above displayed content by the client computer 110(x) and updates the content of the print order (x) (hereinafter, called "print order (x')") in accordance with necessity to issue the updated content for the center server 150 through the network 140.

The center server 150 receives the print order (x') transmitted from the client computer 110(x) and obtains target image data and an image ID (X') corresponding to the print order (x') from the order information stored before.

Then, the center server 150 transmits the image ID (x') to the client computer 110(x) and also transmits the target image data and the print order (x') to the print server 120(x).

The print server 120(x) receives the print order (x') and the target image data transmitted from the center server 150 and executes a print process of the target image data on the basis of the print order (x'). After terminating the print process, a print process end notification is transmitted to the center server 150.

If the print process end notification is received from the print server 120(x), the center server 150 updates the contents of the previously stored order information (x), and then transmits the print process end notification to-the client computer 110(x).

In a case where the user does not store the image ID (x) when the print order (x) of the last time was issued, the user accesses to any of the electronic watermark detection apparatuses 130(1) to 130(N) (here, it is assumed as an electronic watermark detection apparatus 130(x)) by the client computer 110(x) through the network 140 and transmits image data of the printed result of the last time read by a scanner or the like to the electronic watermark detection apparatus 130(x). Or, the user goes to the electronic watermark detection apparatus 130(x) to cause the apparatus to read the printed result of the last time. The electronic watermark detection apparatus 130(x) detects electronic watermark information from the transmitted image or the read image. That is, the image ID (x) is detected and transmitted to the center server 150.

Thereafter, a process can be executed similarly to the process in the above case that the user stores the order information (x) including the image ID (x) when the print order (x) of the last time was issued.

Figure 2:
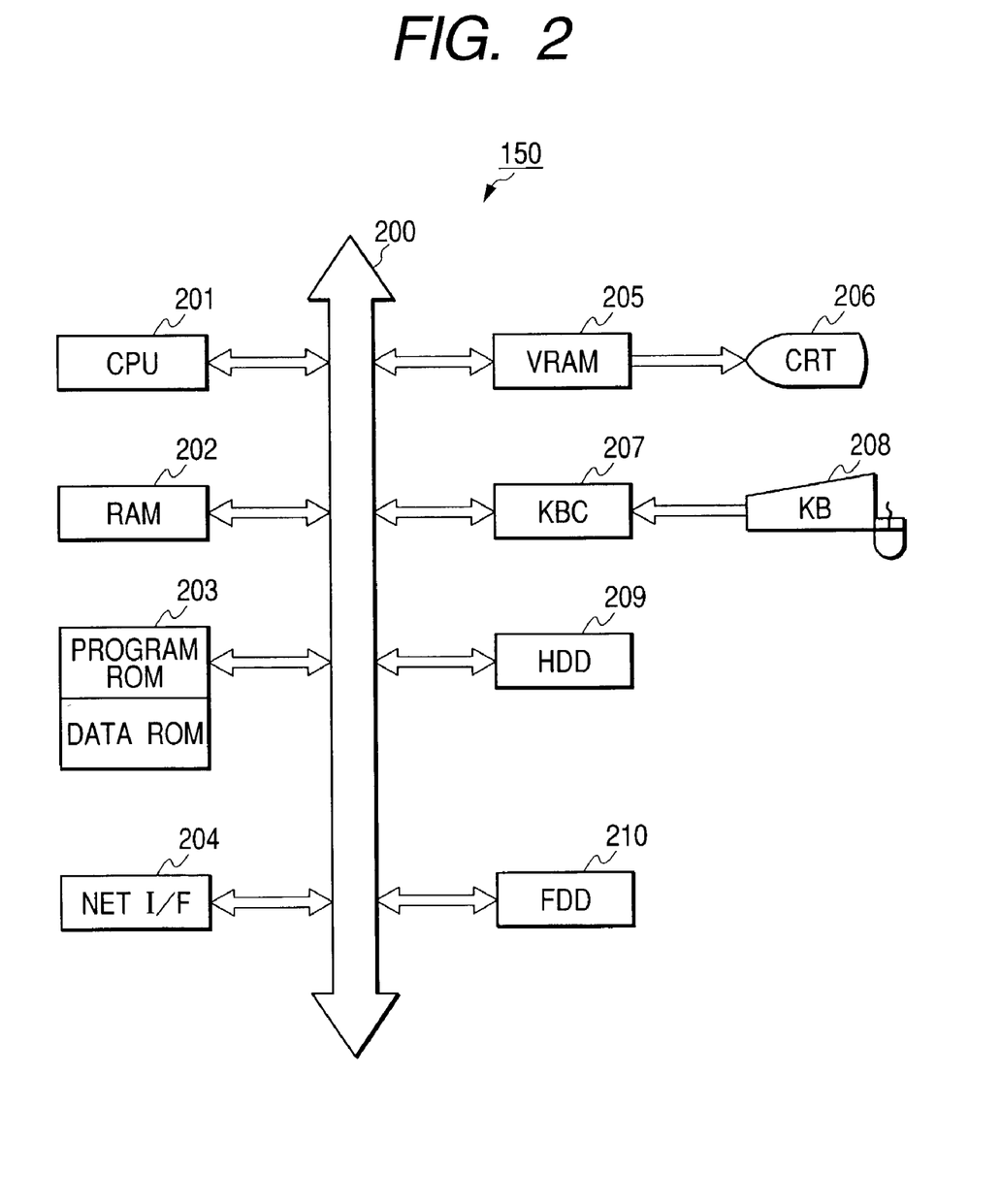
FIG. 2 is a block diagram showing the structure of a center server on the above network system.

<Internal Structure of Center Server 150>

For example, as shown in FIG. 2, the center server 150 is structured with a connected state to enable a CPU 201, a RAM 202, a ROM 203, a NET I/F 204, a VRAM 205, a KBC 207, an HDD 209 and an FDD 210 to perform transmission and reception of data each other through an input/output bus 200.

The CPU 201 is a central processing unit of managing an operation control of an entire of the center server 150 by executing a predetermined processing program.

The RAM (random access memory) 202 functions as a main memory of the CPU 201 and also functions as a storage area of the processing program executed in the CPU 201, an execution area of the processing program and an area for various data.

The ROM (read only memory) 203 stores the processing program (program of indicating an operation procedure of the center server 150) executed in the CPU 201.

More particularly, the ROM 203 includes a program ROM of storing a basic software (OS) being the processing program for performing the operation control of the center server 150 and a data ROM in which information or the like necessary for driving the center server 150 is stored. It should be noted that the HDD 209 may be used instead of the ROM 203.

The NET I/F (network interface) 204 executes a process such as a control required for performing the communication through the network 140, judgment of the connection status, or the like.

The VRAM (video RAM) 205 performs an image expansion necessary for displaying information indicating a driving status or the like of the center server 150 on a screen using a CRT 206 acting as a display unit and also performs a display control at that time.

The CRT 206 is, for example, a display unit such as a CRT display. As the display unit, it is not limited to the CRT 206, but an optional one is applicable.

The KBC (keyboard controller) 207 controls an input from a KB (keyboard) 208 acting as an external input device.

The KB 208 is a keyboard acts as an external input device for accepting an operation of performing various operation instructions to the center server 150 by a user at the center server 150. As the external input device, it is not limited to the KB 208 but a pointing device such as a mouse or the like is applicable.

The HDD (hard disk drive) 209 is used for storing data such as an application software program, image data or the like. The application software program in the present embodiment indicates a software program of performing function of the present embodiment.

The FDD (flexible disk driver) 210 which is an external input/output device for performing an input/output operation of data for a flexible disk acts as a removable disk reads the above application software program stored in the flexible disk. As the external input/output device, it is not limited to the FDD 210 but, for example, a CD-ROM drive or the like is applicable.

It is possible that the application software program or data to be stored in the HDD 209 is stored in the flexible disk for use of that program or that data.

The input/output bus 200 is such a bus which includes an address bus, a data bus and a control bus used for connecting each of the above units.

Figure 3:
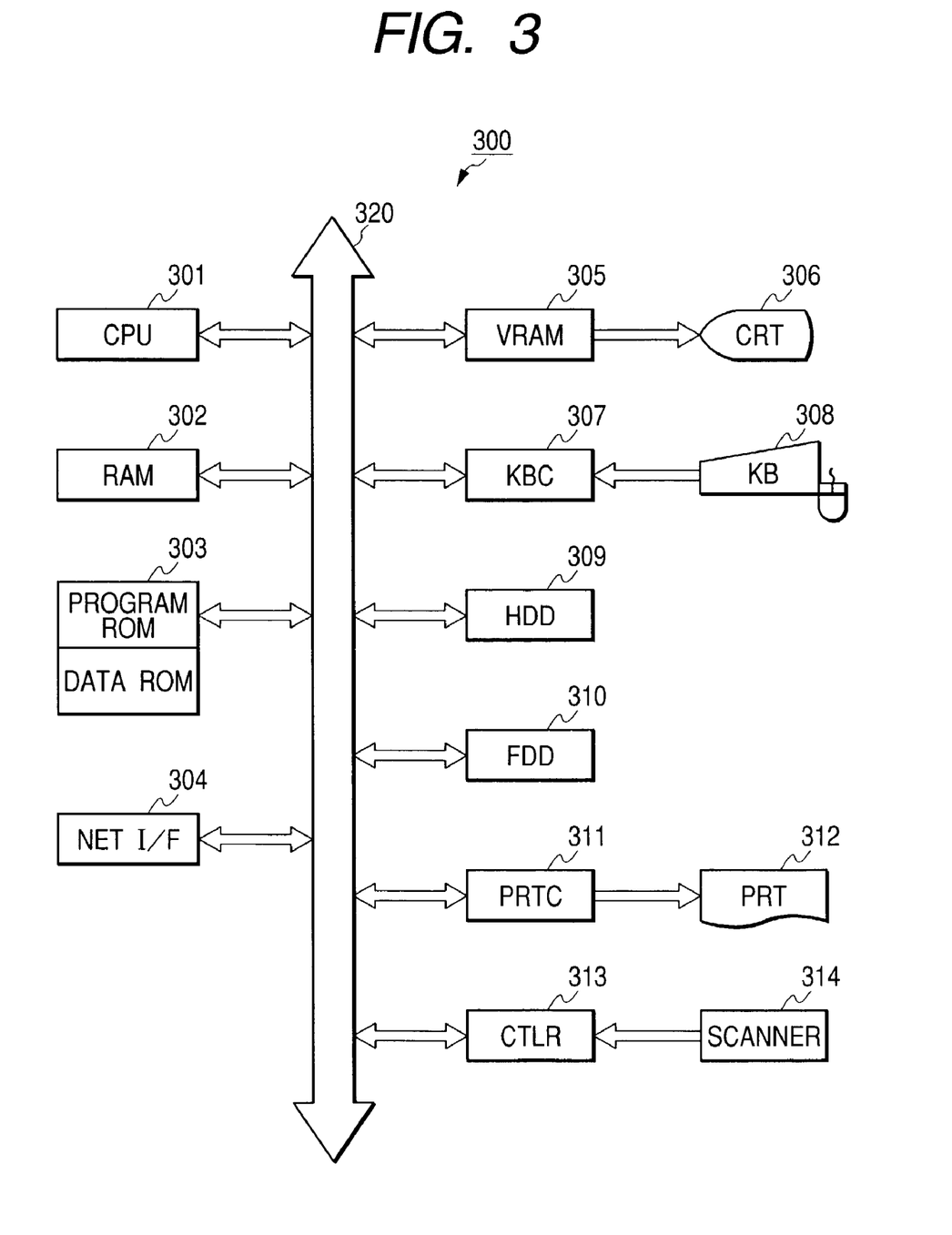
FIG. 3 is a block diagram showing the structure of a client computer, a print server and an electronic watermark detection apparatus on the above network system.

<Internal Structures of Client Computer 110(x), Print Server 120(x) and Electronic Watermark Detection Apparatus 130(x)>

Each of the client computer 110(x), the print server 120(x) and the electronic watermark detection apparatus 130(x) has the function of an information processing apparatus 300 as shown in FIG. 3.

Since respective internal structure of the client computers 110(1) to 110(N), the print server 120(1) to 120(N) and the electronic watermark detection apparatuses 130(1) to 130(N) are same as the hardware structure of the information processing apparatus 300 shown in FIG. 3 and there is no difference in the stricture, the explanation will be collectively given for the structure of the information processing apparatus 300.

As shown in FIG. 3, the information processing apparatus 300 is structured with a connected state to enable a CPU 301, a RAM 302, a ROM 303, a NET I/F 304, a VRAM 305, a KBC 307, an HDD 309, an FDD 310, a PRTC 311 and a CTLR 313 to perform transmission and reception of data each other through an input/output bus 320.

The CPU 301 is a central processing unit of managing an operation control of an entire of the information processing apparatus 300 by executing a predetermined processing program.

The RAM (random access memory) 302 functions as a main memory of the CPU 301 and also functions as a storage area of the processing program executed in the CPU 301, an execution area of the processing program and an area for various data.

The ROM (read only memory) 303 stores the processing program (program of indicating an operation procedure of the information processing apparatus 300) executed in the CPU 301.

More particularly, the ROM 303 includes a program ROM of storing a basic software (OS) being the processing program for performing the operation control of the information processing apparatus 300 and a data ROM in which information or the like necessary for driving the information processing apparatus 300 is stored. It should be noted that the HDD 309 may be used instead of the ROM 303.

The NET I/F (network interface) 304 executes a process such as a control required for performing the communication through the network 140, judgment of the connection status, or the like.

The VRAM (video RAM) 305 performs an image expansion necessary for displaying information indicating a driving status or the like of the information processing apparatus 300 on a screen using a CRT 306 acting as a display unit and also performs a display control at that time.

The CRT 306 is, for example, a display unit such as a CRT display. As the display unit, it is not limited to the CRT 306, but an optional one is applicable.

The KBC (keyboard controller) 307 controls an input from a KB (keyboard) 308 acting as an external input device.

The KB 308 is a keyboard acts as an external input device for accepting an operation of performing various operation instructions to the information processing apparatus 300 by a user at the information processing apparatus 300. As the external input device, it is not limited to the KB 308 but a pointing device such as a mouse or the like is applicable.

The HDD (hard disk drive) 309 is used for storing data such as an application software program for controlling a print process or the like, image data or the like. The application software program in the present embodiment indicates a software program of performing function of the present embodiment.

The FDD (flexible disk driver) 310 which is an external input/output device for performing an input/output operation of data for a flexible disk acts as a removable disk reads the above application software program stored in the flexible disk. As the external input/output device, it is not limited to the FDD 310 but, for example, a CD-ROM drive or the like is applicable.

It is possible that the application software program or data to be stored in the HDD 309 is stored in the flexible disk for use of that program or that data.

The PRTC (printer controller) 311 performs a control of a PRT (printer) 312 acting as an external output device and a control of image data to be outputted on the print.

A CTLR (controller of expansion external input/output device) 313 controls a scanner 314 acting as an expansion external input/output device.

The scanner 314 is the expansion external input/output device for reading image data on the print. As the expansion external input/output device, it is not limited to the scanner 314 but an apparatus, a system or the like having an external input function of inputting image data is applicable.

The input/output bus 320 is such a bus which includes an address bus, a data bus and a control bus used for connecting each of the above units.

Figure 4:
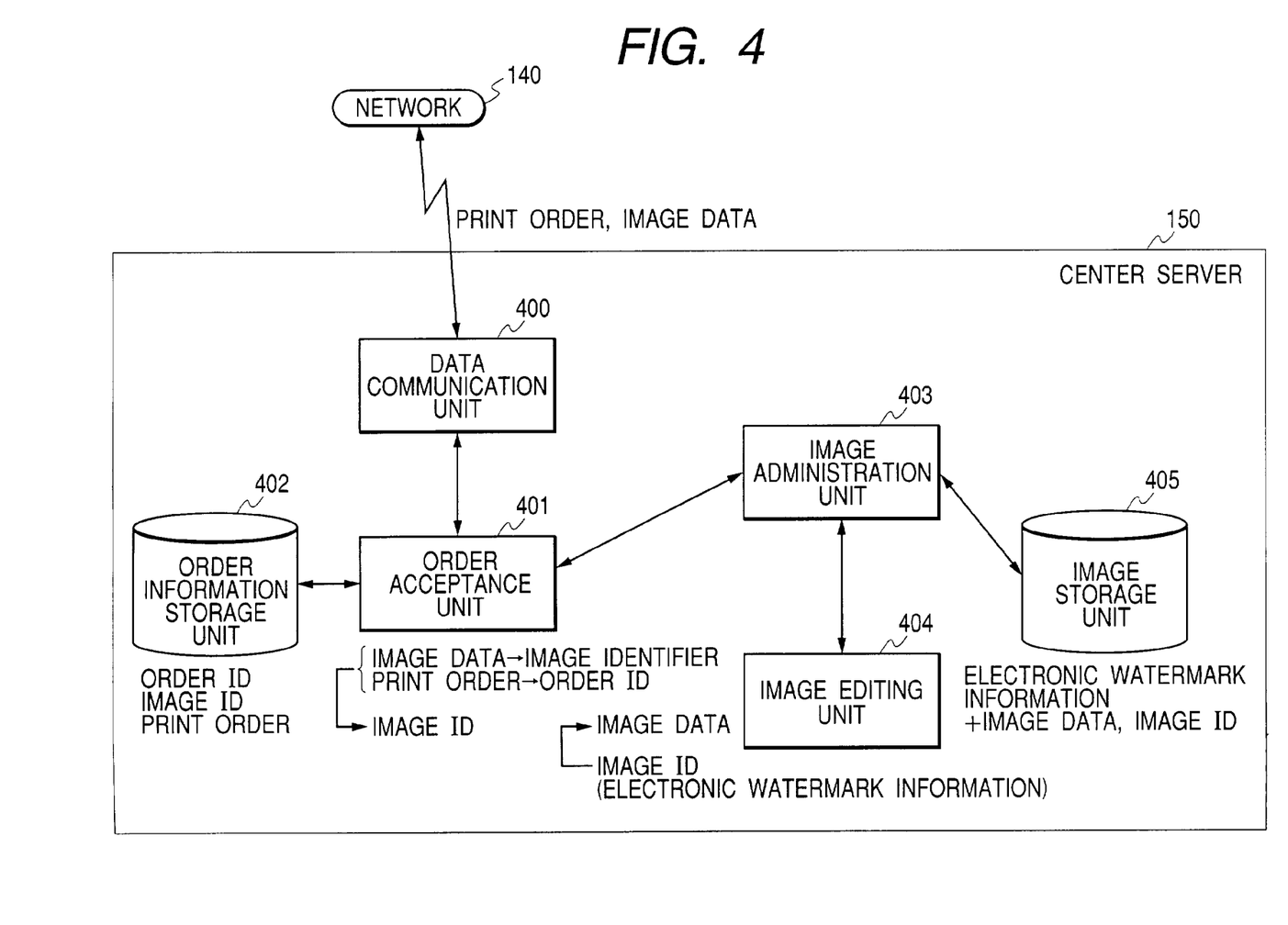
FIG. 4 is a block diagram showing the functional structure of the center server.

<Main Function of Center Server 150>

FIG. 4 shows the function to be performed by the structure shown in FIG. 2 included in the center server 150. More particularly, in the structure shown in FIG. 2, the CPU 102 expands the application software program stored in the ROM 203, the HDD 209 or the FDD 210 to the RAM 202 to execute that program, thereby performing the function of units 400 to 405 to be explained in the following.

As shown in FIG. 4, the center server 150 includes a data communication unit 400, an order acceptance unit 401, an order information storage unit 402, an image administration unit 403, an image editing unit 404 and an image storage unit 405.

The data communication unit 400 performs a transmission/reception of data with the client computers 110(1) to 110(N) and the print servers 120(1) to 120(N) on the network 140 through the NET I/F 204.

The data communication unit 400 is structured that a data transmission/reception process can be executed by a processing program or the like generally called an internet server program or a WWW server program, a process of expanding the application software program stored in the HDD 209 or the like to the RAM 202 for use of that program can be executed in accordance with requests from the client computers 110(1) to 110(N), a confirmation of a user ID is performed for a request from an external unit in accordance with necessity, and a process of restricting data to be returned to the request sender can be executed.

The order acceptance unit 401 receives the print order and the target image data transmitted from the client computers 110(1) to 110(N) through the data communication unit 400 and generates an order ID of the print order and an identifier (image identifier) of the target image data and further generates an image ID from the order ID and the image identifier. The order acceptance unit 401 transfers the image ID and the target image data to the image administration unit 403 and stores the image ID and the print order into the order information storage unit 402.

The order information storage unit 402 stores the image ID and the print order from the order acceptance unit 401, an identifier for identifying a user (user identifier), the number of prints designated from the user, information related to the user (user information), and the like. Furthermore, the order information storage unit 402 is structured that optional information can be searched from the stored information, while addition, update, deletion and the like of the optional information can also be performed.

The image administration unit 403 receives the image ID and the target image data sent from the order acceptance unit 401 to store them into the image storage unit 405. The image administration unit 403 searches the corresponded image data from the image storage unit 405 on the basis of the image ID sent from the order acceptance unit 401. Furthermore, the image administration unit 403 transfers the image ID and the target image data sent from the order acceptance unit 401 to the image editing unit 404 and receives image data, to which an editing process was executed, from the image editing unit 404 to store it into the image storage unit 405.

As to an image ID and image data received from the image administration unit 403, the image editing unit 404 embeds the above image ID in the above image data as invisible electronic watermark information and supplies the image data, in which the electronic watermark information has been embedded (image data to which an editing process was executed), to the image administration unit 403.

It should be noted that an embedding method of the electronic watermark information is not limited especially but the known method or the like is applicable.

The image storage unit 405 stores the order ID and the image data managed by the image administration unit 403 in a state of associating them each other, and also stores image data in which the corresponded electronic watermark information has been embedded (image data to which an editing process was executed).

Figure 5:
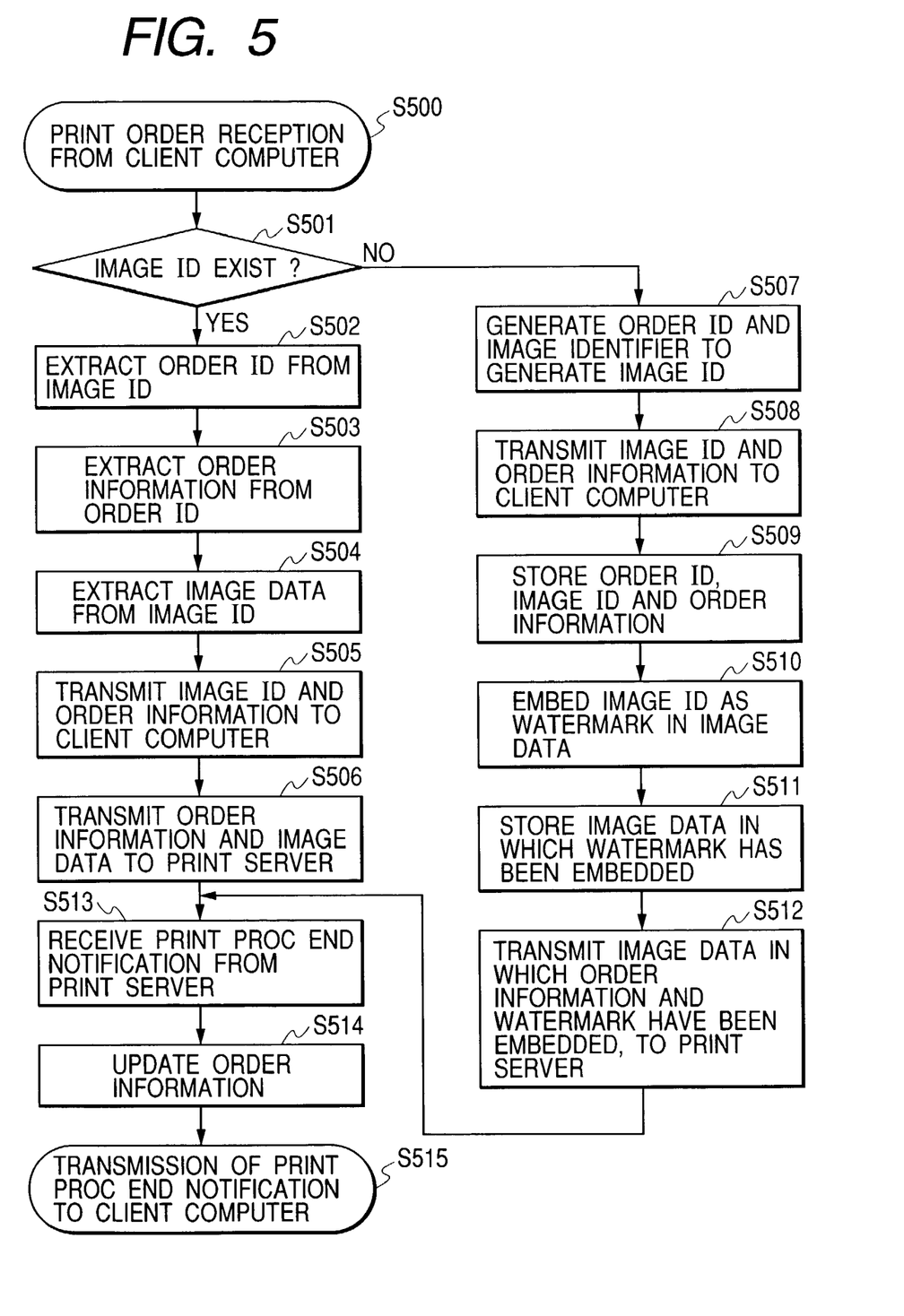
FIG. 5 is a flow chart for explaining an operation of the center server.

<Operation of Center Server 150>

FIG. 5 shows an operation of the center server 150. More particularly, it shows an operation in case of receiving the above print order from the client computers 110(1) to 110(N) using a flow chart.

For example, in the structure shown in FIG. 2, the CPU 201 reads a processing program according to the flowchart in FIG. 5 stored in the ROM 203, the HDD 209 or the FDD 210 and executes the program. According to this operation, the center server 150 operates as explained below.

Step S500:

The data communication unit 400 observes that the print order (x) is received from the client computer 110(x) and transfers the print order (x) to the order acceptance unit 401 when the print order (x) is received.

Step S501:

The order acceptance unit 401 discriminates whether or not the image ID (x) related to the print order (x) sent from the data communication unit 400 exists in the order information storage unit 402.

As a result of the discrimination, when the image ID (x) exists in the order information storage unit 402, it is regarded that an order is a reprint order, and the flow advances to a step S502 to proceed to following processes. On the other hand, when the image ID (x) does not exist in the order information storage unit 402, it is regarded that an order is a new print order, and the flow advances to a step S507 to proceed to following processes.

Step S502:

As a result of the discrimination in the step S501, when the image ID (x) exists (in case of the reprint order), the order acceptance unit 401 obtains an order ID (x-1) being an identifier of a print order (x-1) of the last time from the order information storage unit 402 on the basis of the image ID (x).

Step S503:

The order acceptance unit 401 obtains the print order (x-1) of the last time stored in the order information storage unit 402 on the basis of the order ID (x-1) obtained in the step S502.

The order acceptance unit 401 transfers the order ID (x-1) obtained in the step S502 to the image administration unit 403.

Step S504:

The image administration unit 403 obtains the corresponded image data, in which the electronic watermark information has been embedded, from the image storage unit 405 which manages the image ID and the image data, in which the electronic watermark information has been embedded, in a state of associating the image ID with that image data, on the basis of the order ID (x-1) sent from the order acceptance unit 401, and transfers the obtained image data to the order acceptance unit 401.

Step S505:

The order acceptance unit 401 transfers the print order (x) sent from the client computer 110(x) and an image ID (x-1) detected from the image data, in which the electronic watermark information has been embedded, sent from the image administration unit 403 to the data communication unit 400.

The data communication unit 400 transmits the print order (x) and the image ID (x-1) sent from the order acceptance unit 401 to the client computer 110(x).

Step S506:

The order acceptance unit 401 transfers the print order (x-1) of the last time obtained in the step S503 and image data obtained from the image data, in which the electronic watermark information has been embedded, transferred from the image administration unit 403 in the step S504 to the data communication unit 400.

The data communication unit 400 transmits the print order (x-1) and the image data sent from the order acceptance unit 401 to a corresponded print server (it is assumed as a print server 120(x)) among the print servers 120(1) to 120(N). Then, processes in a step S513 and following steps later described are executed.

Step S507:

As a result of the discrimination in the above step S501, when the image ID (x) does not exist (in case of a new print order), the order acceptance unit 401 captures the target image data transmitted from the client computer 110(x) through the data communication unit 400 and generates an image identifier for identifying the target image data and an order ID (x) for identifying the print order (x) transmitted from the client computer 110(x).

Then, the order acceptance unit 401 generates the image ID (x) from the above image identifier and the order ID (x).

It should be noted that a generation method of the order ID (x) and the image identifier is not limited especially. However, it is preferable that the order ID (x) takes an unique value (overlapped value is prohibited) by itself. Also, as to the image identifier, it is preferable that the image identifier takes an unique value (overlapped value is prohibited) by itself similar to a case of the order ID (x). Furthermore, it is preferable that the image ID (x) generated from the order ID (x) and the image identifier also takes an unique value.

Step S508:

The order acceptance unit 401 transmits the image ID (x) generated in the step S507 and the print order (x) sent from the client computer 110(x) to the client computer 110(x).

Step S509:

The order acceptance unit 401 stores the order ID (x), the image ID (x) and the print order (x) generated in the step S507 into the order information storage unit 402 with a state of associating them each other.

Step S510:

The order acceptance unit 401 transfers the target image data and the image ID (x) obtained in the step S507 to the image editing unit 404 through the image administration unit 403.

As to the image data and the image ID (x) sent from the order acceptance unit 401, the image editing unit 404 embeds the image ID in the image data as the electronic watermark information.

It should be noted that an embedding method of the electronic watermark information is not limited especially but the known method or the like is applicable.

Step S511:

The image editing unit 404 transfers the image data in which the electronic watermark information has been embedded to the image administration unit 403.

The image administration unit 403 stores the image data, in which the electronic watermark information has been embedded, sent from the image editing unit 404 into the image storage unit 405 in a state of associating that image data with the image ID (x).

Step S512:

The order acceptance unit 401 obtains the image data, in which the electronic watermark information has been embedded, from the image storage unit 405 through the image administration unit 403 and transfers that image data to the data communication unit 400 together with the print order (x) sent from the client computer 110(x).

The data communication unit 400 transmits the image data and the print order (x) sent from the order acceptance unit 401 to the corresponded print server (it is assumed as a print server 120(x)) among the print servers 120(1) to 120(N).

Step S513:

After terminating the process in the step S506 or the step S512, a print process is executed in the print server 120(x). After terminating this print process, the order acceptance unit 401 waits for reception of a print process end notification sent through the data communication unit 400 in the center server 150.

Step S514:

The order acceptance unit 401 executes an update process indicating the print end to the print order (x) stored into the order information storage unit 402 on the basis of the order ID (x) corresponding to the print process end notification (order ID (x) corresponding to the image data to which a print process was executed) sent from the print server 120(x).

Step S515:

The order acceptance unit 401 transmits the print process end notification to the client computer 110(x) through the data communication unit 400 after terminating the update of print order information in the step S514. The printed papers are delivered to the user by way of delivering by hand or mailing.

Figure 6:
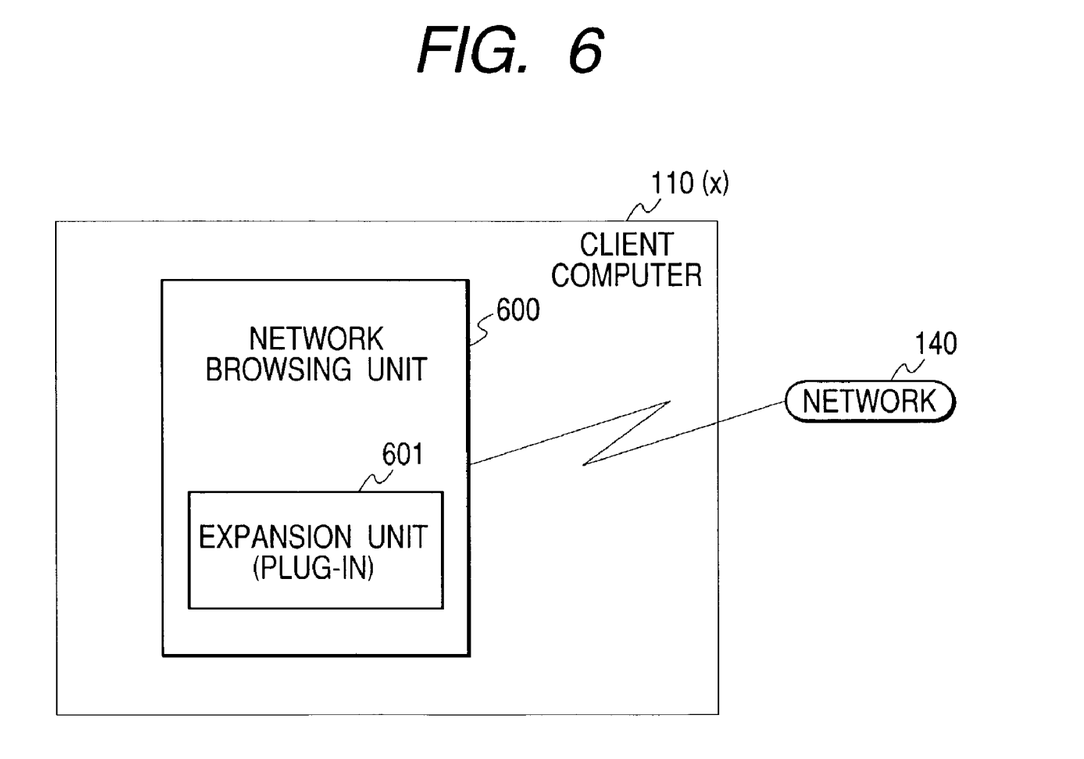
FIG. 6 is a block diagram showing the functional structure of the client computer.

<Main Function of Client Computers 110(1) to 110(N)>

To simplify the explanation, the optional client computer 110(x) is noticed among the client computers 110(1) to 110(N) to give the following explanation.

The client computer 110(x) has, for example, a network browsing unit 600 and an expansion unit 601 as shown in FIG. 6. The functions of the network browsing unit 600 and the expansion unit 601 are performed by a manner that the CPU 301 expands the application software program stored in the ROM 303, the HDD 309 or the FDD 310 to the RAM 302 and executes that program, for example, in the structure of the information processing apparatus 300 shown in FIG. 3.

The function of the network browsing unit 600 is performed by an application software program (general application software program such as so-called an internet browser or the like) of enabling to accept a service from an external such as an internet or the like through the network 140.

The function of the network browsing unit 600 can be expanded by installing the expansion unit (plug-in module) 601.

The function of the expansion unit 601 is performed by an application software program to be added to the network browsing unit 600.

For example, the function of the expansion unit 601 can be performed by expanding the application software program stored in the HDD 309 to the RAM 302. This application software program and the program of performing the function of the network browsing unit 600 are simultaneously executed. According to this execution, both of the expansion unit 601 and the network browsing unit 600 are activated, thereby realizing the function of obtaining the data or the like on the network 140, transmitting the data and displaying the data on the CRT 306.

Figure 7:
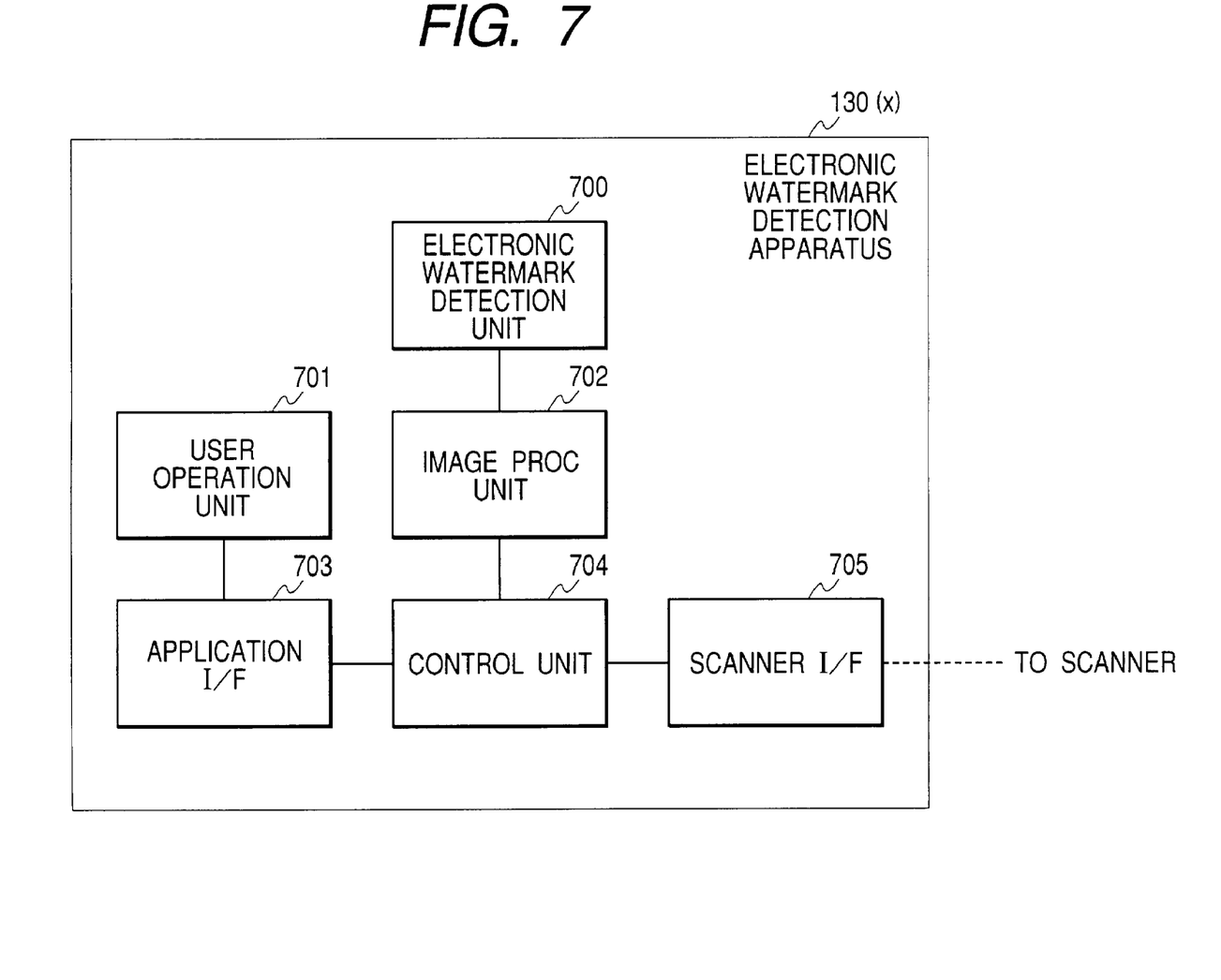
FIG. 7 is a block diagram showing the functional structure of the electronic watermark detection apparatus.

<Main Function of Electronic Watermark Detection Apparatuses 130(1) to 130(N)>

To simplify the explanation, the electronic watermark detection apparatus 130(x) is noticed among the electronic watermark detection apparatuses 130(1) to 130(N) to give the following explanation.

For example, as shown in FIG. 7, the electronic watermark detection apparatus 130(x) has an electronic watermark detection unit 700, a user operation unit 701, an image processing unit 702, an application interface (I/F) 703, a control unit 704 and a scanner interface (I/F) 705. For example, in the structure of the information processing apparatus 300 shown in FIG. 3, the functions of the respective structural units 700 to 705 are performed by a manner that the CPU 301 expands the application software program stored in the ROM 303, the HDD 309 or the FDD 310 to the RAM 302 to execute that program.

The electronic watermark detection unit 700 detects electronic watermark information from image data read by the scanner 314. A detection method of the electronic watermark information depends on an embedding method when the electronic watermark information was embedded and can cope with various methods of embedding the electronic watermark information.

The user operation unit 701 provides means by which the user actually operates the scanner 314 and has a function of displaying the image data read by the scanner 314, a function of editing the image data read by the scanner 314, a function of displaying the electronic watermark information extracted from the image data read by the scanner 314, and the like.

The image processing unit 702 has a function of executing a process, which was requested by the user using the user operation unit 701, to the image data read by the scanner 314.

The application I/F 703 has a function of controlling the data flow for the user operation unit 701 and the control unit 704.

The control unit 704 mainly has a function of performing an operation control of the scanner 314 acting as an image input device and also has a spool function of spooling the image data read by the scanner 314.

The scanner I/F 705 has a function of controlling the data flow for the scanner 314 acting as the image input device and the control unit 704.

It is needless to say that an object of the present invention can be achieved in a case that a storage medium storing the program codes of a software for realizing the functions of a host computer and terminal devices of the present embodiments is supplied to a system or an apparatus and then a computer (or CPU or MPU) in the system or the apparatus reads and executes the program codes stored in the storage medium.

In this case, the program codes themselves read from the storage medium realize the functions of the present embodiments, and the storage medium storing such the program codes and the program codes constitute the present invention.

The storage medium for supplying the program codes can be, for example, a ROM, a flexible disk, a hard disk, an optical disk, a magnetooptical disk, a CD-ROM, a CD-R, a magnetic tape, a non-volatile memory card or the like.

It is needless to say that the present invention also includes not only a case where the functions of the present embodiments are realized by the execution of the program codes read by the computer, but also a case where an OS (operating system) or the like functioning on the computer executes all the actual process or a part thereof according to the instructions of the program codes, thereby realizing the functions of the present embodiments.

Further, it is needless to say that the present invention includes a case where the program codes read from the storage medium are once written in a memory provided in a function expansion board inserted in the computer or a function expansion unit connected to the computer, and a CPU or the like provided in the function expansion board or the function expansion unit executes all the actual process or a part thereof according to the instructions of the program codes, thereby realizing the functions of the present embodiments.

The present invention is not limited to the above embodiments, but may be modified in various manners.

As explained above, in the present invention, in case of providing a service of performing a print output on the basis of a print output request from an external (user), predetermined identifying information is generated on the basis of the image data and the print output request transmitted from the user, and the predetermined identifying information is given to the image data as electronic watermark information, then the predetermined identifying information and the image data, to which the electronic watermark information was given, are managed and stored by associating that information with that image data. According to this process, in case of requesting the print output again for the same image data, the user has only to perform the print request using the predetermined identifying information corresponding to the image data. That is, the image data has not to be transmitted again as in a case of prior art. In this case, at the print output side, a print output process in accordance with the print output request (print output request of the last time) obtained from the predetermined identifying information corresponding to the image data is executed. Since the electronic watermark information is to be acted as invisible information, extra information for the user is not outputted on the print in case of outputting the image data on the print.

What is claimed is:

1. An image processing apparatus for processing image data to be printed in accordance with a print request from an external, comprising:
   a reception unit adapted to receive a print request and image data;
   an identifying information generation unit adapted to generate identifying information unique to the print request and the image data received by said reception unit;
   an embedding unit adapted to embed electronic watermark information indicating the identifying information in the image data;
   a storage unit adapted to store image data in which the electronic watermark information has been embedded into a storage medium by associating the image data with the identifying information;
   an output unit adapted to output the image data in which the electronic watermark information has been embedded to a print unit;
   a judgment unit adapted to judge whether or not the identifying information is included in the print request received by said reception unit; and
   a reprint control unit adapted to read image data related to the identifying information from the storage medium when it is judged that the identifying information is included and output the image data to the print unit,
   wherein said reprint control unit transmits information related to the previous print request corresponding to the identifying information to a sender of the print request.

2. An apparatus according to claim 1, wherein the identifying information includes a combination of an image ID for identifying the image data and an order ID for identifying the print request.

3. A print control method comprising the steps of:
   receiving a print request and image data;
   generating identifying information unique to the received print order and the image data;
   embedding electronic watermark information indicating the identifying information in the image data;
   storing the image data in which the electronic watermark information has been embedded into a storage medium by associating the image data with the identifying information;
   outputting the image data in which the electronic watermark information has been embedded to a print unit;
   judging whether or not the identifying information is included in the print request received in said receiving step;
   reading image data related to the identifying information from the storage medium when it is judged that the identifying information is included and outputting the image data to the print unit;
   wherein said reprint control step transmits information related to the previous print request corresponding to the identifying information to a sender of the print request.

4. A method according to claim 3, wherein the identifying information includes a combination of an image ID for identifying the image data and an order ID for identifying the print request.

5. A print control method for a print control system having a center server and a client comprising the steps of:
   performing the following steps by the center server:
      receiving a print request and image data from the client;
      generating identifying information unique to the received print order and the image data;
      embedding electronic watermark information indicating the identifying information in the image data;
      storing the image data in which the electronic watermark information has been embedded into a storage medium by associating the image data with the identifying information;
      outputting the image data in which the electronic watermark information has been embedded to a print unit;
      judging whether or not the identifying information is included in the print request received in said receiving step; and
      reading image data related to the identifying information from the storage medium when it is judged that the identifying information is included and outputting the image data to the print unit and transmitting information related to the previous print request corresponding to the identifying information to the client; and performing the following steps by the client:
   extracting electronic watermark information embedded in a print;
   transmitting the extracted electronic watermark information to the center server;
   receiving information related to the previous print request corresponding to the electronic watermark information from the center server;
   displaying information related to a received print request; and
   transmitting a reprint request to the center server,
   wherein the reprint request is obtained by updating a content of the received print request.

6. A method according to claim 5, wherein the print was obtained by previously transmitting the print request to the center server.

7. A computer-readable storage medium which stores a program for causing an image processing apparatus of processing image data to be printed in accordance with a print request from an external to execute the following steps of:

receiving a print request and image data;

generating identifying information unique to the received print order and the image data;

embedding electronic watermark information indicating the identifying information in the image data;

storing the image data in which the electronic watermark information has been embedded into a storage medium by associating the image data with the identifying information;

outputting the image data in which the electronic watermark information has been embedded to a print unit;

judging whether or not the identifying information is included in the print request received in said receiving step; and reading image data related to the identifying information from the storage medium when it is judged that the identifying information is included and outputting the image data to the print unit, wherein said reprint control step transmits information related to the previous print request corresponding to the identifying information to a sender of the print request.

* * * * *

UNITED STATES PATENT AND TRADEMARK OFFICE
CERTIFICATE OF CORRECTION

PATENT NO. : 7,072,489 B2
APPLICATION NO. : 10/201981
DATED : July 4, 2006
INVENTOR(S) : Masaki Shitano It is certified that error appears in the above-identified patent and that said Letters Patent is hereby corrected as shown below:

COLUMN 2:
Line 58, "that" should read -- so that--; and
Line 61, "communicate" should read -- communicate with --.

COLUMN 3:
Line 21, "corresponded" should read -- corresponding --.

COLUMN 5:
Line 25, "to-the" should read -- to the --;
Line 51, "each" should read -- with each --.

COLUMN 6:
Line 20, "acts" should read -- acting --;
Line 58, "stricture," should read -- structure, --; and
Line 67, "each" should read -- with each --.

COLUMN 7:
Line 2, "an entire of the" should read -- the entire --;
Line 36, "acts" should read -- acting --; and
Line 50, "reads" should read -- reading --.

COLUMN 8:
Lines 23 and 51, "that" should read -- so that --.

COLUMN 9:
Line 11, "each" should read -- with each --.

COLUMN 10:
Line 22, "corresponded" should read -- corresponding --; and
Line 55, "each" should read -- with each --.

COLUMN 11:
Line 19, "corresponded" should read -- corresponding --; and
Line 60, "so-called an" should read -- a so-called --.

COLUMN 13:
Line 44, "has not" should read -- does not have --; and
Line 50, "be acted" should read -- act --.

UNITED STATES PATENT AND TRADEMARK OFFICE
CERTIFICATE OF CORRECTION

PATENT NO. : 7,072,489 B2
APPLICATION NO. : 10/201981
DATED : July 4, 2006
INVENTOR(S) : Masaki Shitano It is certified that error appears in the above-identified patent and that said Letters Patent is hereby corrected as shown below:

<u>COLUMN 14:</u>
Line 35, "step;" should read -- step; and --; and
Line 39, "unit;" should read -- unit, --.

Signed and Sealed this

Third Day of April, 2007

JON W. DUDAS
*Director of the United States Patent and Trademark Office*